United States Patent Office 3,809,721
Patented May 7, 1974

---

3,809,721
SUBSTITUTED 2-AMINOMETHYL-4,6-DISUBSTITUTED PHENOLS
Everett M. Schultz, Ambler, and Edward J. Cragoe, Jr., Lansdale, Pa., assignors to Merck & Co., Inc., Rahway, N.J.
No Drawing. Filed Dec. 23, 1970, Ser. No. 101,120
Int. Cl. C07c 87/28
U.S. Cl. 260—570.9       5 Claims

ABSTRACT OF THE DISCLOSURE 2-aminomethyl-4,6-disubstituted phenols and the acid addition salts thereof, wherein the benzene nucleus may be optionally substituted by one or two additional nuclear substituents; which products are useful as diuretics and saluretics. The products may be prepared by treating a nuclear hydroxy (or lower alkoxy) substituted N-(substituted benzyl)carboxamide with an aqueous solution in the presence of an acid or base.

---

This invention relates to a new class of chemical compounds which can be described generally as 2-aminomethyl-4,6-disubstituted phenols and to their nontoxic, pharmaceutically acceptable salts. It is also an object of this invention to describe a novel method for the preparation of the instant 2-aminomethyl-4,6-disubstituted phenols.

Pharmacological studies indicate that the instant products are effective diuretic and saluretic agents which can be used in the treatment of conditions associated with electrolyte and fluid retention and hypertension. When administered in therapeutic dosages in conventional vehicles, the instant products effectively reduce the amount of sodium and chloride ions in the body, lower dangerous excesses of fluid level to acceptable levels and, in general, alleviate conditions usually associated with edema and hypertension.

The 2-aminomethyl-4,6-disubstituted phenols of this invention are compounds having the following structural formula:

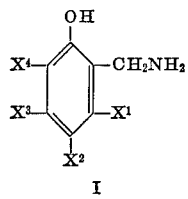

I wherein $X^1$ is hydrogen, alkyl, for example, lower alkyl such as methyl, ethyl, i-propyl and the like or halo such as chloro, bromo, iodo and the like; $X^2$ is halo such as chloro, bromo, iodo and the like, alkyl, for example, lower alkyl such as methyl, ethyl, n-propyl, n-butyl, tert-butyl, pentyl and the like, alkenyl, for example, lower alkenyl such as allyl and the like or alkanoyl, for example, lower alkanoyl such as butyryl and the like; $X^3$ is hydrogen or alkyl, for example, lower alkyl such as methyl and the like, and $X^4$ is alkyl, for example, lower alkyl such as methyl, ethyl, n-propyl, i-propyl, n-butyl, tert-butyl and the like, alkoxy, for example, lower alkoxy such as methoxy and the like, carboxy or aryl, for example, mononuclear aryl such as phenyl and the like with the proviso that the $X^2$ and $X^4$ radicals cannot both be alkyl at the same time, also, either the $X^2$ and $X^3$ radicals or the $X^3$ and $X^4$ radicals may be joined to form a hydrocarbylene chain containing four carbon atoms, for example, 1,3-butadienylene, tetramethylene and the like. Also included are the nontoxic, pharmaceutically acceptable salts, preferably, the nontoxic, pharmaceutically acceptable acid addition salts derived from a nontoxic, pharmaceutically acceptable acid such as hydrochloric acid, hydrobromic acid, hydriodic acid, sulfuric acid, methanesulfonic acid, isethionic acid and the like; salts may also be prepared from the alkali metal bases such as sodium hydroxide, potassium hydroxide and the like.

A preferred embodiment of this invention relates to the substituted 2-aminomethyl-4,6-disubstituted phenols (Ia) having the following structural formula:

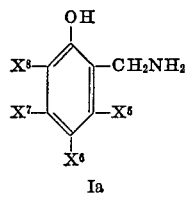

Ia wherein $X^5$ is halo such as chloro and the like or lower alkyl such as methyl and the like; $X^6$ is halo such as chloro and the like or lower alkenyl such as allyl and $X^7$ is hydrogen or lower alkyl such as methyl and $X^8$ is lower alkyl such as methyl and the like or lower alkoxy such as methoxy and the like and the nontoxic, pharmaceutically acceptable acid addition salts thereof. This class of compounds exhibits particularly good diuretic and saluretic activity and represents a preferred subgroup of compounds within the scope of this invention.

The 2-aminomethyl-4,6-disubstituted phenols (I) of this invention may be prepared by treating a nuclear hydroxy (or lower alkoxy) substituted N-(substituted benzyl)carboxamide (II, infra) with an aqueous solution in the presence of an acid, preferably a mineral acid such as hydrochloric acid, hydrobromic acid, sulfuric acid, hydriodic acid and the like. When phenol ethers are employed, i.e., when $R^2$ is lower alkyl, the preferred acids are hydrobromic acid and hydriodic acid. In addition to the mineral acids, bases may also be employed, for example, the alkali metal bases such as sodium hydroxide, potassium hydroxide and the like. Any solvent which is inert or substantially inert to the reactants may be employed such as ethanol, acetic acid and the like. The reaction may be conducted at a temperature in the range of from about 20° to about 110° C. for a period of time of from about 15 minutes to about five hours; however, the reaction is generally conducted at the reflux temperature of the particular solvent employed for a period of time of about one and one-half hours. The product is usually obtained in the form of an acid addition salt and the free amine can be generated by known neutralization methods. The following equation illustrates this reaction employing a mineral acid, $HR^1$, as the catalyst:

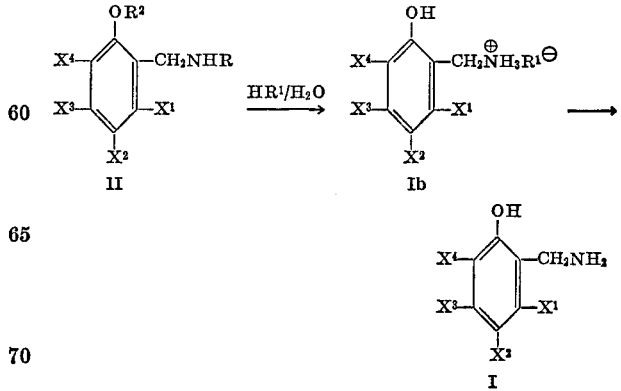

wherein $X^1$, $X^2$, $X^3$ and $X^4$ are as defined above; R is an acyl radical, for example, formyl, haloacetyl such as chloroacetyl and the like, carbamoyl, mononuclear aroyl such as benzoyl and the like, hydroxy substituted mononuclear aroyl such as o-hydroxybenzoyl and the like or trihalomethylcarbonyl such as trichloromethylcarbonyl and the like; $R^{1\ominus}$ is the anion derived from an acid, for example, a mineral acid such as hydrochloric acid, hydrobromic acid, hydriodic acid, sulfuric acid and the like and $R^2$ is hydrogen or lower alkyl.

The nuclear hydroxy (and lower alkoxy) substituted N-(substituted benzyl)carboxamide (II) may be prepared by one of two methods. The first method comprises treating a nuclear hydroxy (or lower alkoxy) substituted benzene (III) with an N-hydroxymethylcarboxamide. A second method comprises treating a nuclear hydroxy (or lower alkoxy) N-(substituted benzyl)carboxamide (IV) with a halogenating agent.

The first of the above-mentioned processes for preparing the nuclear hydroxy (and lower alkoxy) substituted N-(substituted benzyl)carboxamides (II, supra) employed as starting materials in the preparation of the substituted 2-aminomethyl-4,6-disubstituted phenols (I) comprises treating a nuclear hydroxy (or lower alkoxy) substituted benzene (III, infra) with an N-hydroxymethylcarboxamide, for example, N-hydroxymethylurea, 2-halo-N-hydroxymethylacetamide such as 2-chloro-N-hydroxymethylacetamide and the like, N-hydroxymethyl mononuclear arylcarboxamide such as N-hydroxymethylbenzamide and the like, N-hydroxymethyl hydroxy substituted arylcarboxamide such as N-hydroxymethylsalicylamide and the like or N-hydroxymethyl trihaloacetamide such as N-hydroxymethyltrichloroacetamide and the like in the presence of a strong mineral acid such as hydrochloric acid, sulfuric acid and the like. The reaction may be conducted employing as the solvent an excess of the mineral acid employed or with a solvent which is inert or substantially inert to the reactants employed, for example, a lower alkanol such as ethanol and the like or a lower alkanoic acid such as acetic acid and the like. The following equation illustrates this process:

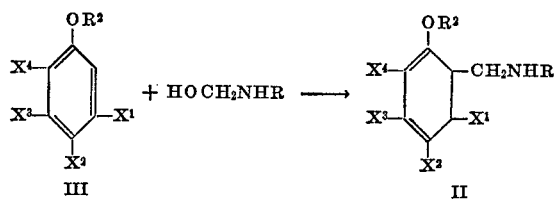

wherein $X^1$, $X^2$, $X^3$, $X^4$, R and $R^2$ are as defined above.

The second of the above-mentioned processes for preparing the nuclear hydroxy (or lower alkoxy) N-(substituted benzyl)carboxamides (II) and one which is employed to prepare those nuclear hydroxy (or lower alkoxy) N-(substituted benzyl)carboxamides wherein $X^1$ is halo (IIa) comprises treating an appropriately N-(substituted benzyl)carboxamide (IV, infra) with a halogenating agent such as sulfuryl chloride, bromine, chlorine gas, iodine monochloride and the like at a temperature in the range of from about 20° C. to about 80° C. Suitable solvents which may be employed include chloroform, benzene and the like. The following equation illustrates this process:

wherein R, $R^2$, $X^6$, $X^7$ and $X^8$ are as defined above and $X^9$ is halo such as chloro, bromo, iodo and the like.

The nuclear hydroxy (or lower alkoxy) N-(substituted benzyl)carboxamides (IV) employed in the halogenation procedure described above, are prepared in the same manner as described above in the preparation of the nuclear hydroxy (or lower alkoxy) N-(substituted benzyl)carboxamides (II, supra). Thus, by treating a nuclear hydroxy (or lower alkoxy) substituted benzene (IIIa) with an N-hydroxymethylcarboxamide the desired nuclear hydroxy (or lower alkoxy) N-(substituted benzyl)carboxamide (IV) is prepared. The following equation illustrates this process:

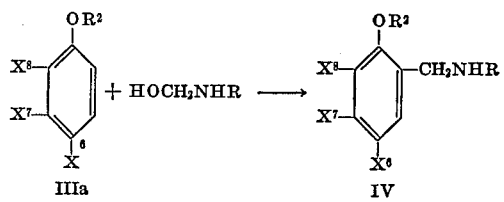

wherein R, $R^2$, $X^6$, $X^7$ and $X^8$ are as defined above.

The examples which follow illustrate the substituted 2-aminomethyl-4,6-disubstituted phenols (I) of this invention and the methods by which they are prepared. However, the examples are illustrative only and it will be apparent to those having ordinary skill in the art that all of the products embraced by Formula I, supra, may also be prepared in an analogous manner by substituting the appropriate starting materials for those set forth in the examples.

EXAMPLE 1

2-aminomethyl-4-chloro-3,5,6-trimethylphenol hydrochloride

A powdered mixture of 4-chloro-2,3,5-trimethylphenol (3.5 g., 0.0206 mole) and 2-chloro-N-hydroxymethylacetamide (2.46 g., 0.02 mole) is added portionwise over 10 minutes to a cooled (ice bath) mixture of concentrated sulfuric acid (4 ml.) and acetic acid (20 ml.). The faintly yellow mixture is stirred at about 20°–25° C. for one hour and then poured into ice water (300 ml.) with vigorous stirring. 2-chloro-N-(5-chloro-2-hydroxy-3,4,6-trimethylbenzyl)acetamide separates as a pale beige powder (5.2 g.) and is added to a mixture of ethanol (50 ml.) and concentrated hydrochloric acid (15 ml.). The resulting mixture is refluxed for one and one-half hours. On cooling (−20° C.) 2-aminomethyl - 4 - chloro-3,5,6-trimethylphenol hydrochloride (2.9 g.) separates and is collected. The filtrate containing unhydrolyzed material is evaporated and the residue is refluxed for two hours in a mixture of ethanol and concentrated hydrochloric acid (3:1). On chilling, an additional amount of product (1.1 g.) is obtained which is combined with the previously recovered material and recrystallized from a mixture of ethanol and concentrated hydrochloric acid and water (3:1:0.15) to obtain 3.1 g. of 2-aminomethyl-4-chloro-3,5,6-trimethylphenol hydrochloride, M.P. 263°–263.5° C.

Elemental analysis for $C_{10}H_{14}ClNO \cdot HCl$: Calc.: C, 50.86; H, 6.40; N, 5.93. Found: C, 50.89; H, 6.40; N, 5.95.

By substituting for the 2-chloro-N-hydroxymethylacetamide of Example 1 an equimolar quantity of N-hydroxymethylurea, N - hydroxymethylbenzamide, N - hydroxymethylsalicylamide, N-hydroxymethyltrichloroacetamide or N-hydroxymethylformamide and by following substantially the procedure described therein, there is obtained, respectively, N-(5 - chloro-2-hydroxy-3,4,6-trimethylbenzyl)urea N-(5-chloro - 2-hydroxy-3,4,6-trimethylbenzyl) benzylamide, N-(5-chloro-2-hydroxy-3,4,6-trimethylbenzyl)salicylamide, N-(5-chloro-2-hydroxy-3,4,6-trimethylbenzyl)trichloroacetamide and N-(5-chloro-2-hydroxy-3,4,6-trimethylbenzyl)formamide, which compounds upon treatment with concentrated hydrochloric acid afford 2-aminomethyl - 4 - chloro - 3,4,6 - trimethylphenol hydrochloride.

EXAMPLE 2

2-aminomethyl-3,4-dichloro-5,6-dimethylphenol hydrobromide

Step A. 2-chloro-N-(5-chloro-2-methoxy-3,4-dimethylbenzyl)acetamide.—4-chloro-2,3-dimethylanisole (28.2 g., 0.116 mole) and 2 - chloro-N-hydroxymethylacetamide (20.4 g., 0.166 mole) is dissolved in acetic acid (150 ml.). Concentrated sulfuric acid (30 ml.) is added slowly at a temperature below 20° C. and then poured into ice water (1 l.). The solid that separates is recrystallized from a mixture of ethanol and water (1.25:1) to obtain 37.3 g. of 2-chloro-N-(5-chloro-2-methoxy - 3,4 - dimethylbenzyl) acetamide, M.P. 138.5°–139.5° C.

Elemental analysis for $C_{12}H_{15}Cl_2NO_2$: Calc.: C, 52.19; H, 5.47; N, 5.04. Found: C, 52.04; H, 5.40; N, 5.10.

Step B. 2-chloro-N-(5,6-dichloro - 2 - methoxy-3,4-dimethylbenzyl)acetamide.—To a stirred mixture of 2-chloro-N-(5-chloro-2-methoxy - 3,4 - dimethylbenzyl) acetamide (2.76 g., 0.01 mole) and anhydrous aluminum chloride (1.45 g., 0.011 mole), there is added at about 20° C. a mixture of freshly distilled sulfuryl chloride (3.0 g.) and sulfur monochloride (4 drops). There is formed a frothy brown liquid that is stirred and heated at 80°–85° C. for 90 minutes. After cooling, the pasty mixture is added to a solution of concentrated hydrochloric acid (20 ml.) in water (200 ml.). A pale yellow powder (2.8 g.) separates which is recrystallized from a mixture of ethanol and water (3:1) to afford 0.75 g. of 2-chloro-N-(5,6-dichloro - 2 - methoxy - 3,4 - dimethylbenzyl)acetamide, M.P. 189°–190° C.

Elemental analysis for $C_{12}H_{14}Cl_3NO_2$: Calc.: C, 46.40; H, 4.54; N, 4.51. Found: C, 46.38; H, 4.52; N, 4.48.

Step C. 2-aminomethyl-3,4-dichloro-5,6-dimethylphenol hydrobromide.—2-chloro-N-(5,6-dichloro - 2 - methoxy-3,4-dimethylbenzyl)-acetamide (1.0 g., 0.0322 mole) is added to a mixture of 48% hydrobromic acid (10 ml.) and acetic acid (10 ml.). Upon refluxing the mixture, a clear solution forms in about 10 minutes and after 20 minutes a solid begins to separate. The mixture is cooled to about 5° C. and the solid that separates is collected, washed with ether, dried at 60° C. and recrystallized from a mixture of ethanol and concentrated hydrobromic acid (4:1) to afford 0.53 g. of 2-aminomethyl-3,4-dichloro-5,6-dimethylphenol hydrobromide, M.P. 260.5°–261° C.

Elemental analysis for $C_9H_{11}Cl_2NO \cdot HBr$: Calc.: C, 35.91; H, 4.02; N, 4.65. Found: C, 36.16; H, 4.00; N, 4.63.

EXAMPLE 3

2-aminomethyl-4-chloro-6-methylphenol hydrochloride

Step A. 2-chloro-N-(5-chloro - 2 - hydroxy-3-methylbenzyl)acetamide.—A well-pulverized mixture of 2-methyl-4-chlorophenol (7.1 g., 0.05 mole) and 2-chloro-N-hydroxymethylacetamide (6.15 g., 0.05 mole) is added, in portions, with stirring and cooling to keep the internal temperature below 20° C., to concentrated sulfuric acid (50 ml.). The mixture then is stirred at about 25° C. for 20 hours, poured onto ice (about 200 g.) to afford 2-chloro-N-(5-chloro-2-hydroxy - 3 - methylbenzyl)acetamide.

Step B. 2-aminomethyl-4-chloro-6-methylphenol hydrochloride.—2 - chloro-N-(5-chloro - 2 - hydroxy-3-methylbenzyl)acetamide is dissolved in absolute ethanol (100 ml.) containing concentrated hydrochloric acid (30 ml.). The mixture is refluxed for 1½ hours, cooled to −20° C. and the precipitate is collected, washed with absolute ethanol and dried at 60° C. The dried solid is recrystallized from a mixture of absolute ethanol and water (1:1) to afford 3.75 g. of 2-aminomethyl-4-chloro-6-methylphenol hydrochloride, M.P. 258.5°–259° C.

Elemental analysis for $C_8H_{10}ClNO \cdot HCl$: Calc.: C, 46.18; H, 5.33; N, 6.73. Found: C, 46.32; H, 5.58; N, 6.73.

EXAMPLE 4

4-allyl-2-aminomethyl-6-methoxyphenol hydrochloride

A mixture of eugenol (49.5 g., 0.3 mole) in acetic acid (180 ml.) and concentrated sulfuric acid (20 ml.) is cooled in an ice bath to 5° C. and 2-chloro-N-hydroxymethylacetamide (18.5 g., 0.15 mole) is added in portions during 15 minutes to the stirred solution. The mixture is allowed to warm to about 20° C. and then, after 45 minutes, is poured into ice water (1200 ml.). The oil that separates is taken up in ether. The ether solution is washed well with water, filtered, and the ether is evaporated to afford crude 2-chloro-N-(5-allyl-2-hydroxy-3-methoxybenzyl)acetamide which is dissolved in a mixture of ethanol (150 ml.) and concentrated hydrochloric acid (50 ml.). The resulting solution is refluxed for one hour, concentrated to 200 ml. and cooled to 20° C. The solid that separates is collected and recrystallized from 95% ethanol to obtain a white solid (M.P. 248°–250° C.) which is dissolved in water (75 ml.). The solution is filtered and concentrated to 25 ml., absolute ethanol (400 ml.) is added and the solution is concentrated to 60 ml. Cooling at −20° C. affords 2.5 g. of 4-allyl-2-aminomethyl-6-methoxyphenol hydrochloride.

Elemental analysis for $C_{11}H_{15}NO_2 \cdot HCl$: Calc.: C, 57.52; H, 7.02; N, 6.10. Found: C, 57.41; H, 7.04; N, 6.45.

By following substantially the procedure described in Example 1 all of the products described in Table I may be prepared. Thus, by substituting an appropriate phenol (IIIb) for the 4-chloro-2,3,5-trimethylphenol of Example 1 and by following substantially the procedure described therein the corresponding substituted 2-aminomethyl-4,6-disubstituted phenols (Ic) of this invention may be prepared. The following equation illustrates the reaction of Example 1 and, together with Table I, illustrate the substituted 2-aminomethyl-4,6-disubstituted phenols obtained. The yields, melting points and analyses are for the final product (Ic).

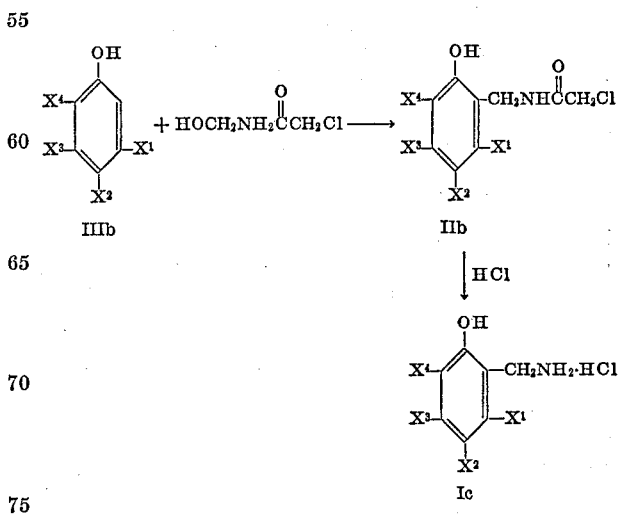

TABLE I.—2-AMINOMETHYL-4,6-DISUBSTITUTED PHENOLS

| | | | | | | Product Ic | | | | | | | |
|---|---|---|---|---|---|---|---|---|---|---|---|---|---|
| | | | | | | | | Analysis | | | | | |
| | | | | | | Melting | | Calc. | | | Found | | |
| Ex. No. | X⁴ | X³ | X² | X¹ | Yield, g. | point, °C. | Formula | C | H | N | C | H | N |
| 5 | —OCH₃ | H | Cl | Cl | 1.33 (39%) | 231.5–232 | $C_8H_9Cl_2NO_2 \cdot HCl$ | 37.17 | 3.90 | 5.42 | 37.59 | 3.90 | 5.42 |
| 6 | —CH₃ | H | Cl | Cl | 1.06 (9.1%) | 242–243 | $C_8H_9Cl_2NO \cdot HCl$ | 39.61 | 4.16 | 5.78 | 39.70 | 4.26 | 5.72 |
| 7 | —CH₃ | H | —OC(CH₂)₂CH₃ | H | 1.6 (45.3%) | 224–227 | $C_{12}H_{17}NO_2 \cdot HCl$ | 59.13 | 7.44 | 5.75 | 59.24 | 7.36 | 5.64 |
| 8 | —C₆H₅ | H | —Cl | H | 1.3 (10.2%) | 193–194 | $C_{13}H_{12}ClNO \cdot HCl$ | 57.80 | 4.85 | 5.18 | 57.94 | 4.87 | 5.19 |
| 9 | —C(O)OH | H | —Cl | H | 4.05 (29.9%) | 260–261 | $C_8H_8ClNO_3 \cdot HCl$ | 40.36 | 3.81 | 5.88 | 40.38 | 3.69 | 5.89 |
| 10 | —C(O)OH | H | —C(CH₃)₃ | H | 1.1 (10%) | 234–234.5 | $C_{12}H_{17}NO_3 \cdot HCl$ | 55.49 | 6.99 | 5.39 | 55.89 | 7.16 | 5.54 |
| 11 | —OCH₃ | H | —n-C₃H₇ | H | 1.1 (10.36%) | 245–248 | $C_{11}H_{17}NO_2 \cdot HCl$ | 57.02 | 7.83 | 6.04 | 57.64 | 7.98 | 5.90 |
| 12 | —OCH₃ | H | —CH₃ | H | 1.6 (52.5%) | 253–253.5 | $C_9H_{13}NO_2 \cdot HCl$ | 53.08 | 6.93 | 6.72 | 53.04 | 6.96 | 6.72 |
| 13 | —CH₃ | —CH₂CH₂CH₂CH₂— | | —CH₃ | 1.5 (28.4%) | 235–235.5 | $C_{13}H_{19}NO \cdot HCl$ | 64.59 | 8.34 | 5.79 | 64.43 | 8.22 | 5.61 |
| 14 | —CH₂CH₂CH₂CH₂— | | Cl | H | 3.72 (24.7%) | 254–255 | $C_{11}H_{14}ClNO \cdot HCl$ | 53.24 | 6.09 | 5.65 | 53.40 | 6.21 | 5.59 |
| 15 | —CH=CHCH=CH— | | Cl | H | 1.9 (15.5%) | 221–222 | $C_{11}H_{10}ClNO \cdot HCl$ | 54.12 | 4.54 | 5.74 | 54.21 | 4.47 | 5.68 |
| 16 | —CH₃ | —CH₃ | Br | H | | | | | | | | | |
| 17 | —CH₃ | H | Br | —CH₃ | | | | | | | | | |
| 18 | —CH₃ | —CH₃ | I | H | | | | | | | | | |
| 19 | —CH₃ | H | I | —CH₃ | | | | | | | | | |
| 20 | —n-C₃H₇ | H | Br | H | | | | | | | | | |
| 21 | —n-C₄H₉ | H | Br | H | | | | | | | | | |
| 22 | —tert-C₄H₉ | H | Br | H | | | | | | | | | |
| 23 | —CH₃ | H | Br | —i-C₃H₇ | | | | | | | | | |
| 24 | —i-C₃H₇ | H | Br | —CH₃ | | | | | | | | | |
| 25 | —CH₃ | H | I | —i-C₃H₇ | | | | | | | | | |
| 26 | —i-C₃H₇ | H | I | —CH₃ | | | | | | | | | |

The novel compounds of this invention are diuretic and saluretic agents which can be administered in a wide variety of therapeutic dosages in conventional vehicles as, for example, by oral administration in the form of a tablet or by intravenous injection. Also, the daily dosage of the products may be varied over a wide range varying from 5 to 2,000 mg. The product is preferably administered in subdivided doses in the form of scored tablets containing 5, 10, 25, 50, 100, 150, 250 and 500 milligrams of the active ingredient for the symptomatic adjustment of the dosage to the patient to be treated. These dosages are well below the toxic or lethal dose of the products which may be administered in a total daily dosage of from 100 mg. to 2,000 mg. in a pharmaceutically acceptable carrier.

A suitable unit dosage form of the products of this invention can be administered by mixing 50 milligrams of a substituted 2-aminomethyl-4,6-disubstituted phenol (I) or a suitable salt thereof, with 149 mg. of lactose and 1 mg. of magnesium stearate and placing the 200 mg. mixture into a No. 1 gelatin capsule. Similarly, by employing more of the active ingredient and less lactose, other dosage forms can be put up in No. 1 gelatin capsules and, should it be necessary to mix more than 200 mg. of ingredients together, larger capsules may be employed. Compressed tablets, pills, or other desired unit dosages can be prepared to incorporate the compounds of this invention by conventional methods and, if desired, can be made up as elixirs or as injectable solutions by methods well known to pharmacists.

It is also within the scope of this invention to combine two or more of the compounds of this invention in a unit dosage form or to combine one or more of the compounds of this invention with other known diuretics and saluretics or with other desired therapeutic and/or nutritive agents in dosage unit form.

The following example is included to illustrate the preparation of a representative dosage form:

EXAMPLE 27

Dry-filled capsules containing 50 mg. of active ingredient per capsule

| | Mg. per capsule |
|---|---|
| 2-aminomethyl-3,4-dichloro - 5,6 - dimethylphenol hydrochloride | 50 |
| Lactose | 149 |
| Magnesium stearate | 1 |
| Capsule (size No. 1) | 200 |

The 2-aminomethyl-3,4-dichloro - 5,6 - dimethylphenol hydrochloride is reduced to a No. 60 powder and then lactose and magnesium stearate are passed through a No. 60 bolting cloth onto the powder and the combined ingredients admixed for 10 minutes and then filled into a No. 1 dry gelatin capsule.

Similar dry-filled capsules can be prepared by replacing the active ingredient of the above example by any of the other novel compounds of this invention.

It will be apparent from the foregoing description that the substituted 2-aminomethyl-4,6-disubstituted phenols (I) of this invention constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:

1. A compound of the formula:

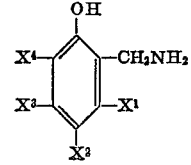

wherein $X^1$ is hydrogen, lower alkyl or halo; $X^2$ is halo, lower alkyl, lower alkenyl or lower alkanoyl; $X^3$ is hydrogen or lower alkyl and $X^4$ is lower alkyl, lower alkoxy, or phenyl, with the proviso that the $X^2$ and $X^4$ radicals cannot both be lower alkyl at the same time or the $X^2$ and $X^3$ radicals or the $X^3$ and $X^4$ radicals may be joined to form a hydrocarbylene chain containing four carbon atoms; and the nontoxic, pharmaceutically acceptable salts thereof.

2. A compound according to claim 1 of the formula:

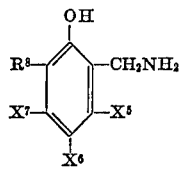

wherein $X^5$ is hydrogen, halo or lower alkyl; $X^6$ is halo or lower alkenyl; $X^7$ is hydrogen or lower alkyl and $X^8$ is lower alkyl or lower alkoxy and the non-toxic, pharmaceutically acceptable acid addition salts thereof.

3. A compound according to claim 2 wherein $X^5$ and $X^6$ are chloro and $X^7$ and $X^8$ are methyl.

4. A compound according to claim 2 wherein $X^6$ is chloro and $X^5$, $X^7$ and $X^8$ are methyl.

5. A compound according to claim 2 wherein $X^6$ is allyl, $X^5$ and $X^7$ are hydrogen and $X^8$ is methoxy.

References Cited

UNITED STATES PATENTS

| 3,118,941 | 1/1964 | Swett et al. | 260—570.9 UX |
| 3,341,594 | 9/1967 | Thoma et al. | 260—570.6 |

OTHER REFERENCES

Wagner et al., "Organic Synthesis," 678–79 (1953).

ROBERT V. HINES, Primary Examiner

U.S. Cl. X.R.

260—501.18, 501.19, 519, 553 (R), 559 (S), 562 (R), (B), 612 (D), 621 (R), 623 (R); 424—309, 316, 330